United States Patent
Ebergen

(10) Patent No.: US 7,139,786 B2
(45) Date of Patent: Nov. 21, 2006

(54) METHOD AND APPARATUS FOR EFFICIENTLY PERFORMING A SQUARE ROOT OPERATION

(75) Inventor: Josephus C. Ebergen, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 667 days.

(21) Appl. No.: 10/436,610

(22) Filed: May 12, 2003

(65) Prior Publication Data

US 2004/0230630 A1    Nov. 18, 2004

(51) Int. Cl.
   *G06F 7/552*    (2006.01)
(52) U.S. Cl. ........................ 708/605; 708/500
(58) Field of Classification Search ........... 708/605, 708/500
   See application file for complete search history.

(56) References Cited

U.S. PATENT DOCUMENTS

| 4,939,686 | A | | 7/1990 | Fandrianto ............... 364/752 |
|---|---|---|---|---|
| 5,280,439 | A | | 1/1994 | Quek et al. ................ 364/760 |
| 5,404,324 | A | | 4/1995 | Colon-Bonet ............... 364/761 |
| 5,671,171 | A | | 9/1997 | Yu et al. ...................... 364/748 |
| 5,751,619 | A | | 5/1998 | Agarwal et al. ......... 364/736.02 |
| 5,787,030 | A | | 7/1998 | Prabhu et al. ............... 364/761 |
| 5,870,323 | A | * | 2/1999 | Prabhu et al. ............... 708/650 |
| 6,115,733 | A | * | 9/2000 | Oberman et al. ........... 708/654 |
| 6,360,241 | B1 | * | 3/2002 | Matson et al. .............. 708/493 |
| 6,564,239 | B1 | * | 5/2003 | Matson et al. .............. 708/605 |
| 6,779,012 | B1 | * | 8/2004 | Matson et al. .............. 708/500 |
| 2002/0143839 | A1 | * | 10/2002 | Matson et al. .............. 705/605 |

* cited by examiner

*Primary Examiner*—D. H. Malzahn
(74) *Attorney, Agent, or Firm*—Park, Vaughan & Fleming LLP

(57) ABSTRACT

One embodiment of the present invention provides a system that performs a carry-save square root operation that calculates an approximation of a square root, Q, of a radicand, R. The system calculates Q by iteratively selecting an operation to perform based on higher-order bits of a remainder, r, and then performs the operation. This operation can include subtracting two times a square root calculated thus far, q, and a coefficient, c, from r, and adding c to q. During this operation, the system maintains r in carry-save form, which eliminates the need for carry propagation while updating r, thereby speeding up the square root operation. Furthermore, the selection logic, which decides what operation to perform next, is simpler than previous square-root implementations, thereby providing a further speedup.

13 Claims, 2 Drawing Sheets

METHOD AND APPARATUS FOR EFFICIENTLY PERFORMING A SQUARE ROOT OPERATION

BACKGROUND

1. Field of the Invention

The present invention relates to techniques for performing mathematical operations within computer systems. More specifically, the present invention relates to a method and an apparatus for efficiently performing a square root operation in circuitry within a computer system.

2. Related Art

In order to keep pace with continually increasing microprocessor clock speeds, computational circuitry within the microprocessor core must perform computational operations at increasingly faster rates. One of the most time-consuming computational operations is a square root operation. Performing a square root operation involves finding the square root Q of a radicand R.

Computer systems often perform square root operations using a technique that iteratively performs subtraction and/or addition operations on a remainder calculated thus far, r, to retire a fixed number of bits of Q in each iteration.

Unfortunately, each iteration involves selecting and performing a number of addition and/or subtraction operations that require time-consuming carry completions. Hence, hardware implementations of existing square root techniques tend to be relatively slow.

What is needed is a method and an apparatus for performing a square root operation that takes less time than existing techniques.

SUMMARY

One embodiment of the present invention provides a system that performs a square root operation that calculates an approximation of a square root, Q, of a radicand, R. The system calculates Q by iteratively selecting an operation to perform based on higher-order bits of a remainder, r, and then performs the operation. This operation can include subtracting two times a square root calculated thus far, q, and a coefficient, c, from r, and adding c to q. During this operation, the system maintains r in carry-save form, which eliminates the need for carry propagation while updating r, thereby speeding up the square root operation. Furthermore, the selection logic, which decides what operation to perform next, is simpler than previous square-root implementations, thereby providing another important speedup.

In a variation on this embodiment, maintaining r in carry-save form involves maintaining a sum component, $r_s$, and a carry component, $r_c$.

In a variation on this embodiment, the operation additionally maintains q in carry-save form by maintaining a sum component, $q_s$, and a carry component, $q_c$. In this embodiment, initializing q involves setting $q_s=0$ and $q_c=0$.

In a variation on this embodiment, the operation does not maintain q in carry-save form, and the operation uses an on-the-fly technique to update q.

In a variation on this embodiment, the system initializes r, q and c by: setting $r_s=R$ and $r_c=0$; setting q=0; and setting c=1.

In a variation on this embodiment, the operation can involve multiplying both $r_s$ and $r_c$ by 2 and dividing c by 2.

In a variation on this embodiment, the operation can involve multiplying both $r_s$ and $r_c$ by 2, dividing c by 2, and inverting the most significant bits of $r_s$ and $r_c$.

In a variation on this embodiment, the operation can involve multiplying both $r_s$ and $r_c$ by 4, dividing c by 4 and then inverting the most significant bits of $r_s$ and $r_c$.

In a variation on this embodiment, the operation can involve subtracting (2q+c) from $r_s$ and $r_c$, adding c to $q_s$ and $q_c$, multiplying both $r_s$ and $r_c$ by 2, dividing c by 2, and then inverting the most significant bits of $r_s$ and $r_c$.

In a variation on this embodiment, the operation can involve subtracting (4q+4c) from $r_s$ and $r_c$, adding 2c to $q_s$ and $q_c$, multiplying both $r_s$ and $r_c$ by 2, dividing c by 2, and then inverting the most significant bits of $r_s$ and $r_c$.

In a variation on this embodiment, the operation can involve adding (2q+c) to $r_s$ and $r_c$, subtracting c from $q_s$ and $q_c$, multiplying both $r_s$ and $r_c$ by 2, dividing c by 2, and then inverting the most significant bits of $r_s$ and $r_c$.

In a variation on this embodiment, the operation can involve adding (4q+4c) to $r_s$ and $r_c$, subtracting 2c from $q_s$ and $q_c$, multiplying both $r_s$ and $r_c$ by 2, dividing c by 2, and then inverting the most significant bits of $r_s$ and $r_c$.

Figure 1A:
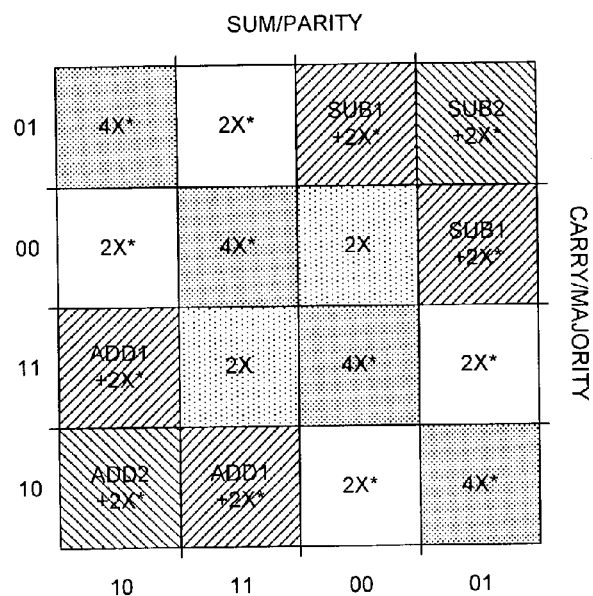
FIG. 1A illustrates a set of regions defined by higher-order bits of sum and carry words for a remainder in accordance with an embodiment of the present invention.

Table 1 lists actions that facilitate rounding in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The square root operation computes $\sqrt{R}$ for a given R, where R is also referred to as the "radicand" and $\sqrt{R}$ is referred to as the "significand." The IEEE standard on binary floating-point arithmetic requires that.

$$R \in [1,4) \qquad (1)$$

Normally, significands are in the range [1,2), but because the exponents of radicands must be even, odd exponents of radicands are decremented by one and the significand of those radicands are doubled, which explains the extended range for R. With condition (i) on R the range for $\sqrt{R}$ is $$\sqrt{R} \in [1,2)$$

We also require that the computed result $\sqrt{R}$ is rounded to the nearest number with L fractional bits. This means that the computed result has an error of at most ulp/2, where ulp=$2^{-L}$ for some L>0. The abbreviation ulp stands for "unit of least-significant position."

Technique A

Technique A computes an approximation of the square root Q, where the formula $$Q^2=R$$

expresses the desired relation between Q and R. The technique uses variables q, r, and c. The invariant for these variables is as follows.

$$q^2+c^*r=R \quad (2)$$

The variable q represents the square root calculated "thus far," and $c^*r$ represents the remainder "thus far."

Technique A appears below, where conditions B0 through B2 are yet to be defined.

```
q:=0; c:=1; r:=R; n:=0;
while B0 do {
    if B1 then {r:=r*2; c:=c/2; n:=n+1}
    elseif B2 then {r:=r-2*q-c; q:=q+c}
fi
```

For later use, we have introduced the variable n to count the number shifts on c.

Obviously, the initialization q:=0; c:=1; r:=R establishes invariant (2) before the start of the repetition in Technique A. An alternative initialization, which you may find in many textbooks on computer arithmetic, is q:=1; c:=1; r:=R−1.

Each of the statements in the if-then-else statement maintains invariant (2), irrespective of the conditions B1 and B2. For example, if invariant (2) holds before statement r:=r−2*q−c; q:=q+c, then after execution of this statement we have $$(q+c)^2 + c^*(r - 2^*q - c) = (q^2 + 2^*q^*c + c^2) + (c^*r - 2^*c^*q - c^2)$$
$$= q^2 + c^*r$$

Thus, invariant (2) also holds after the statement.

How do we determine B0 through B3? There are several ways to do this. The following way yields Technique A.

$$B0 = n < L+1$$

$$B1 = (r < 2q+c)$$

$$B2 = (2q+c \leq r)$$

It turns out that with these choices for B0 through B2, each time the technique executes the alternative with condition B2, then in the following repetition step the technique executes the alternative with condition B1. This property follows from the fact that $0 \leq r < 4q+4c$ is an additional invariant of this technique.

Technique A computes the unique binary representation of square root q, producing one bit in each repetition step. Execution of alternative B1 selects 0 as the next square-root bit and execution of alternative B2 followed by alternative B1 selects 1 as the next square-root bit. Notice that c represents the unit of the added bit, when the bit is added.

The termination condition B0 follows from the precision needed in the square root q and the observation that $c=2^{-n}$ is an invariant of the technique. If the required precision in q is L fractional bits, then the termination condition n<L+1 produces a final result q with L fractional bits and an error of at most ulp=$2^{-L}$, i.e., $\sqrt{R} \in [q, q+ulp)$. Because Technique A increments n at least in every other step, this technique is guaranteed to terminate.

In order to obtain the correct rounded result, the technique must determine whether q must be rounded up to q+ulp. For this purpose, the technique computes $$r_h:=r-2^*q-c; \quad q_h:=q+c$$

with $c=2^{-(L+1)}$. Notice that $q_h$ lies exactly halfway between two adjacent floating-point numbers, and invariant (2) still holds for $q_h$ and $r_h$. Accordingly, the sign of $r_h$ points in the direction of the ideal result $\sqrt{R}$ relative to $q_h$. Consequently, if $r_h<0$ then q is the rounded result, and if $r_h \geq 0$ then the rounded result is q+ulp.

The technique for square root with the above choices for B0 through B2 is also called restoring square root. Some of us may have learned this technique in elementary school for the decimal system.

Adding Alternatives

In the following techniques, we make two changes. First, we allow more alternatives that maintain invariant (2). Second, we use carry-save additions for the additions to r in the technique. These carry-save additions keep r in carry-save form.

Let us look at some additional alternatives first.

elseif $B3$ then $\{r:=r+2^*q-c; q:=q-c\}$ elseif $B4$ then $\{r:=r-4^*q-4^*c; q:=q+2^*c\}$ elseif $B5$ then $\{r:=r+4^*q-4^*c; q:=q-2^*c\}$ elseif $B6$ then $\{r:=r^*4; c:=c/4\}$ The first alternative allows a decrement of c to q and the second and third alternatives allow an increment and decrement of $2^*c$ to q, respectively. The fourth alternative allows a quadrupling of r. Note that each of the statements $r:=r+2^*q-c; q:=q-c$ $r:=r-4^*q-4^*c; q:=q+2^*c$ $r:=r+4^*q-4^*c; q:=q-2^*c$ and $r:=r^*4; c:=c/4$ maintains invariant (2), irrespective of the conditions B3, B4, B5, and B6. For example, if invariant (2) holds before statement r:=r−4 *q−4*c; q:=q+2*c, then after execution of this statement we have $$(q+2^*c)^2 + c^*(r - 4^*q - 4^*c) = (q^2 + 4^*q^*c + 4^*c^2) +$$
$$(c^*r - 4^*c^*q - 4^*c^2)$$
$$= q^2 + c^*r$$

Thus, invariant (2) also holds after the statement.

Carry-Save Addition

The second change involves keeping the remainder r in carry-save form. That is, instead of a single remainder r, we have a pair $r_0$, $r_1$, where $r_0+r_1=r$. The pair $r_0$, $r_1$ is produced by full adders, each of which produce a sum bit and a carry bit, also called the parity and majority bit respectively. One variable, say $r_0$, represents all the sum bits and the other variable, say $r_1$, represents all the carry bits. By storing r in carry-save form, the implementation does not need to resolve the carry bits for each addition, and thereby avoids a computation that can take an amount of time proportional to the logarithm of the number of bits in the worst case.

We use an addition function add(x,y,z) that takes three inputs and renders two results $add_0(x,y,z)$ and $add_1(x,y,z)$ such that $$add_0(x,y,z)+add_1(x,y,z)=x+y+z.$$

In this disclosure, we denote an addition of z to $r=r_0+r_1$ with this addition function as $$r0,r1:=add(r0, r1, z)$$

The meaning of this notation is that $r_0$ gets assigned the value $add_0(r_0, r_1, z)$ and $r_1$ gets assigned the value $add_1(r_0, r_1, z)$.

We also use a two's complement representation. Recall that in a two's complement representation subtracting z is the same as adding −z, where −z is the bit-wise complement of z plus a carry at the least-significant bit position. Because the least significant bit of the carry bit vector $r_1$ is always 0, we can change this bit to 1 when we add −z. Consequently, in additions of the form $add(r_0, r_1, z)$, z may be a negative number.

The variable q can also be split into a sum $q_0$ and a carry $q_1$, and additions to q can be performed by a carry-save adder. Alternatively, q can be calculated "on the fly," because the changes to q are simple additions of c, 2c, −c, or −2c. In a following section, we show that computing binary representations of q and q−2*c on the fly helps speed up the square-root technique. As a consequence, in one embodiment of the present invention we refrain from splitting q into $q_0$ and $q_1$.

Finally, we add one more alternative to the repetition. This alternative executes a translation of $(r_0, r_1)$ over (t,−t). Here t can be any binary number and t can be positive or negative. Notice that $(r_0+t)+(r_1-t)(r_0+r_1)$, so these translations maintain invariant (2).

Technique B appears below. As before, we use B0 to express the termination condition. Later, we give a precise expression for B0. We have expressed each of the conditions for the alternatives as a condition on $(r_0, r_1)$. Thus, these conditions define regions in the $(r_0, r_1)$ plane. For the moment, we have given each of these regions an appropriate name, without specifying where the region is.

```
q:=0; c:=1; r0:=R; r1:=0; n:=0;
while B0 do {
    if ((r0,r1) in 2X) then
        { r0,r1:=r0*2,r1*2; c:=c/2; n:=n+1}
    elseif ((r0,r1) in 4X) then
        { r0,r1:=r0*4,r1*4; c:=c/4; n:=n+2 }
    elseif ((r0,r1) in SUB1) then
        { r0,r1:=add(r0,r1,-2q-c); q:=q+c}
    elseif ((r0,r1) in SUB2) then
        { r0,r1:=add(r0,r1,-4q-4c); q:=q+2c}
```

-continued

```
    elseif ((r0,r1) in ADD1) then
        { r0,r1:=add(r0,r1, 2q-c); q:=q-c)}
    elseif ((r0,r1) in ADD2) then
        { r0,r1:=add(r0,r1, 4q-4c); q:=q-2c)}
    elseif ((r0,r1) in TRANS) then
        { r0,r1:=r0+t,r1-t}
    fi
}
```

Recall that the above technique maintains invariant (2) irrespective of the choice of regions 2X through TRANS.

Defining Regions

The regions and operations on $(r_0, r_1)$ are almost identical to the regions and operations on $(r_0, r_1)$ in the division techniques explained a in related patent application, Ser. No. 10/436,577, filed on 12 May 2003 by inventor Josephus C. Ebergen, et al., entitled "Method and Apparatus for Efficiently Performing a Carry-Save Division Operation,", which is hereby incorporated by reference. Similar to the various optimizations of the division algorithm, we choose two sets of regions and associated operations for the square-root algorithm.

Figure 2A:
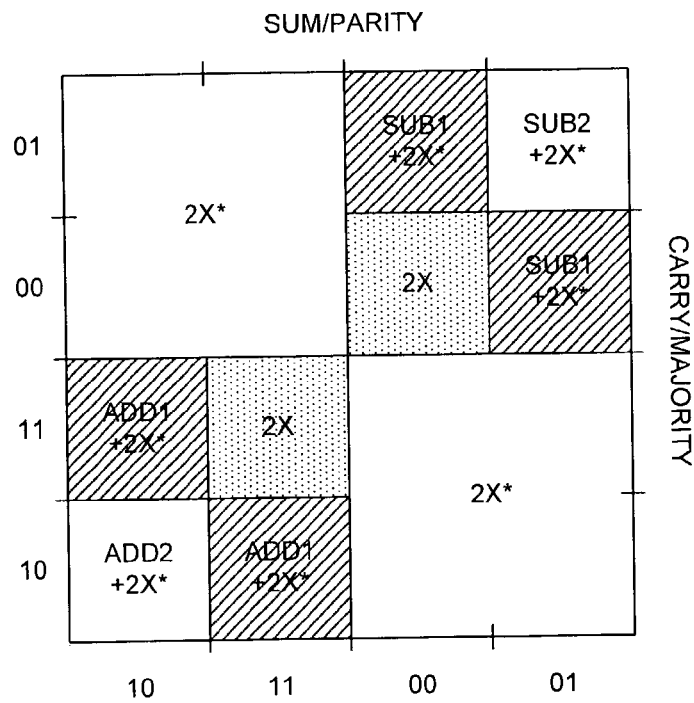
FIG. 2A illustrates another set of regions defined by higher-order bits of sum and carry words for the remainder in accordance with another embodiment of the present invention.

FIGS. 1A and 2A illustrate the regions associated with two different square root techniques in accordance with an embodiment of the present invention. Note that the two most significant bits in the two's complement representation of $r_0$ and $r_1$ determine the regions associated with the operations. For the TRANS operation we choose a translation over (+t, −t) or (−t, +t), where $t=2^{K+1}$ and K+1 is the position of the most significant bit of $r_0$ and $r_1$.

FIGS. 1A and 2A illustrate the regions in which specific operations apply. In particular, these operations include 2X, 2X*, 4X*, SUB1+2X*, SUB2+2X*, ADD1+2X*, and ADD2+2X*. The region 2X* indicates the operations for 2X followed by a translation. Similarly, the region SUB2+2X* indicates the operations SUB2 followed by the operations for 2X followed by the operations for TRANS. As explained in the above-cited related patent application, performing the operations 2X* and 4X* on $(r_0, r_1)$ can be implemented by a left shift of $r_0$ and $r_1$ followed by inversion of the most significant bits of $r_0$ and $r_1$. This simplifies the implementations of the operations 2X* and 4X*.

Figure 1B:
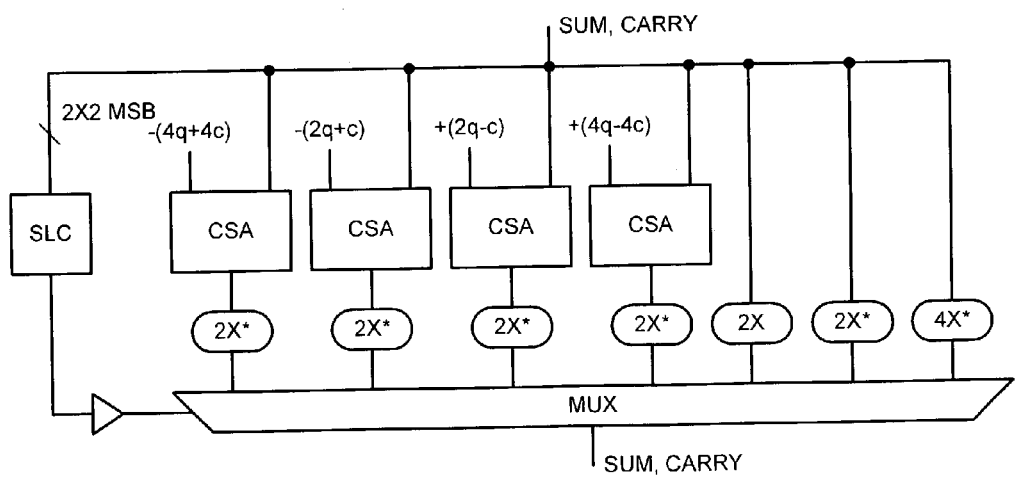
FIG. 1B illustrates a corresponding hardware implementation of a square root circuit in accordance with an embodiment of the present invention.
Figure 2B:
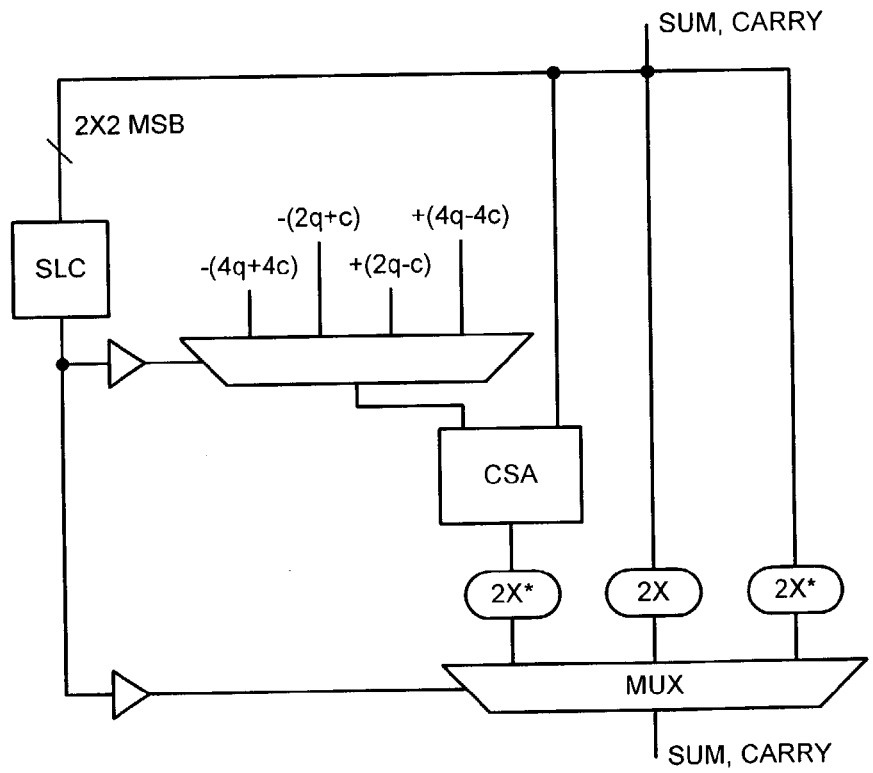
FIG. 2B illustrates a corresponding hardware implementation of a square root circuit in accordance with an embodiment of the present invention.

Hardware implementations of the different techniques are illustrated in FIGS. 1B and 2B. These figures provide a rough schematic showing the elementary modules in an implementation. These modules are a carry-save adder, indicated by "CSA," a multiplexer, indicated by a trapezoid, the selection logic, indicated by "SLC," and the implementations of the other actions of the techniques, indicated by 2X, 2X*, 4X*, or just *.

These figures do not show the accumulation of quotient digits or any other operations on the quotient. The figures also do not show implementations of any post-processing steps, like the implementation of any restoration step, rounding, or conversion that must occur for the quotient after termination of the technique. These may be implemented using any one of a number of standard techniques.

Note that splitting the multiplexer in two parts, as illustrated in FIG. 2B, may have some advantages. First, the implementation illustrated in FIG. 2B uses only one carry-save adder, whereas implementation illustrated in FIG. 1B uses four carry-save adders, which consume a significant amount of area and energy. Second, the implementation of FIG. 2B avoids a large fan-in and a large fan-out for the final multiplexer, assuming that stages are cascaded. The large fan-in and fan-out with one multiplexer slows down the critical path for all of the alternatives. Splitting the multiplexer into two decreases the critical path delay for the alternatives that exclude the carry-save adder and it increases the critical path delay for the alternatives that include the carry-save adder. Increasing the difference between path delays for the respective alternatives may be bad for a synchronous circuit implementation, but an asynchronous implementation may be able to take advantage of this difference by achieving an average-case delay that is less than the critical path delay of the implementation with the large multiplexer. This situation may apply if the alternatives that exclude carry-save addition occur more frequently than the alternatives that include carry-save addition.

On-the-Fly Conversion Process

The above-described square-root operation computes a result in the form of a redundant binary representation with digit set $\{-1,0,1\}$ or $\{-2,-1,0,1,2\}$ for example. If the operation computes one digit of the redundant binary representation per repetition step, then the unique binary representation of the result can be computed "on the fly" as is described in a following section.

Note that many division and square root techniques successively approximate the final result q by performing one of following operations to q in each repetition step. Here c is of the form $c=2^{-n-1}$, where $2^{-n}$ is the unit of the least-significant position in q.

$q:=q-2*c;\ c:=c/2$ $q:=q-c;\ c:=c/2$ $q:=q;\ c:=c/2$, that is, $q$ remains unchanged $q:=q+c;\ c:=c/2$ $q:=q+2*c;\ c:=c/2$ Many techniques use only the middle three operations; some use all five. Basically, these techniques calculate a binary representation for q with redundant digit set $\{-2,-1,0,1,2\}$.

The problem with redundant binary representations is that such representations are not unique. Having the unique binary representation of q may be important. When the unique binary representation of q is available in each repetition step, savings can be obtained in time, energy, and area. For example, many square-root techniques need to compute $r:=r-2*q+c$ in some step. This computation can be done with one full adder for each bit if r is in carry-save form and q is in a unique binary representation. If both r and q are in carry-save representation, however, then the computation requires at least two full adders in sequence for each bit, thus wasting more time, area, and energy.

Fortunately, if the technique computes a redundant binary representation of q with redundant digit set $\{-2,-1,0,1,2\}$ and the technique computes one digit in each repetition step, then the unique binary representation of q can be calculated on the fly.

Details of Conversion Process

Let us assume that Q denotes the binary representation of q and that the unit of the least-significant bit of Q is $2^{-n}$. Furthermore, assume that $c=2^{-n-1}$. In other words, $2*c$ equals the unit of the least-significant position in Q. Consequently, an implementation of $q:=q+c$ is simply postfixing Q with a 1. Similarly, implementing $q:=q-c$ is simply postfixing Q with $-1$.

In order to construct the unique binary representation of q, instead of the redundant representation with digit set $\{-1,0,1\}$, we maintain invariant I0:

$Q_0$ is the unique binary representation of q
$Q_{-1}$ is the unique binary representation of $q-2*c$ If initially the invariant I0 holds, then each of the following statements maintains invariant I0.

$q:=q-c;\ c:=c/2;\ Q_0,\ Q_{-1}:=Q_{-1}1,\ Q_{-1}0$ $q:=q;\ c:=c/2;\ Q_0,\ Q_{-1}:=Q_00,\ Q_{-1}1$ $q:=q+c;\ c:=c/2;\ Q_0,\ Q_{-1}:=Q_01,\ Q_00$

If we include the operations $q:=q+2*c$ and $q:=q-2*c$, then we maintain invariant I1:

$Q_{+1}$ is the unique binary representation of $q+2*c$
$Q_0$ is the unique binary representation of q
$Q_{-1}$ is the unique binary representation of $q-2*c$
$Q_{-2}$ is the unique binary representation of $q-4*c$ If initially the invariant I1 holds, then each of the following statements maintains invariant I1:

$q:=q-2*c;\ c:=c/2;\ Q_{+1},\ Q_0,\ Q_{-1},\ Q_{-2}:=Q_{-1}1,\ Q_{-1}0,\ Q_{-2}1,\ Q_{-2}0$ $q:=q-c;\ c:=c/2;\ Q_{+1},\ Q_0,\ Q_{-1},\ Q_{-2}:=Q_00,\ Q_{-1}1,\ Q_{-1}0,\ Q_{-2}1$ $q:=q;\ c:=c/2;\ Q_{+1},\ Q_0,\ Q_{-1},\ Q_{-2}:=Q_01,\ Q_00,\ Q_{-1}1,\ Q_{-1}0$ $q:=q+c;\ c:=c/2;\ Q_{+1},\ Q_0,\ Q_{-1},\ Q_{-2}:=Q_{+1}0,\ Q_01,\ Q_00,\ Q_{-1}1$ $q:=q+2*c;\ c:=c/2;\ Q_{+1},\ Q_0,\ Q_{-1},\ Q_{-2}:=Q_{+1},\ Q_{+1}0,\ Q_01,\ Q_00$

Termination and Rounding

One embodiment of the present invention determines the termination condition B0 and rounds the result according to the IEEE standard on floating-point numbers. First, notice that the range for r satisfies $$r=r_0+r_1\in[-8, 8) \qquad (4)$$

Secondly, for $R\in[1,4)$, $q\in[1,2]$, and $R=q^2+c*r$, we have $|\sqrt{R}-q|\leq\frac{1}{2}*|R-q^2|=\frac{1}{2}*c*|r|\leq 4*c$ In other words, $\sqrt{R}\times -q\in[-4*c, 4*c)$. The length of this error interval is $8*c$, with $c=2^{-n}$. Because upon termination the length of the error interval must be at most $2^{-L}=$ulp, the termination condition becomes $8*c\leq 2^{-L}$ or $B0=(n<L+3)$ Consequently, upon termination q has $L+2$ fractional bits, two more than the specified format.

Upon termination, the result of the square-root technique is rounded to nearest even number, according to the IEEE standard. Note that for a radicand R with L fractional bits, the square root $\sqrt{R}$ never lies exactly halfway between two floating-point numbers. This means that for a square root technique, rounding to nearest even number yields the same result as rounding to nearest number.

Note that when a square-root technique terminates, a restoration step may be necessary. This restoration step adjusts the values of q and r to $q_h$ and $r_h$, respectively, such that $q_h$ lies exactly halfway between two floating-point numbers within the error interval around q and the invariant still holds, i.e., $q_h^2+c*r_h=R$. Moreover, the restoration step restores $r_h$ in its unique binary representation.

At the end of the restoration step, the ideal result $\sqrt{R}$ still lies within an error interval of length at most ulp around $q_h$, and the sign of $r_h$ points in the direction of the ideal result relative to $q_h$. Consequently, if $r_h<0$, then the truncation $q_1$ of $q_h$ to the specified IEEE format is the rounded result, otherwise $q_1$+ulp is the rounded result.

The final adjustments to q and r depend on the last two bits of q and are summarized as follows.

TABLE 1

| Last two digits of q | Actions | |
|---|---|---|
| 00 | $q_h = q - 2 * c$; | $r_h = r + 4 * q - 4 * c$ |
| 01 | $q_h = q + c$; | $r_h = r - 2 * q - c$ |
| 10 | $q_h = q$; | $r_h = r$ |
| 11 | $q_h = q - c$; | $r_h = r + 2 * q - * c$ |

Note that it is unnecessary to calculate the binary representations of q+2*c, q−2*c, and q−4*c, because they have already have been calculated on the fly. The binary representations for these values are given by $Q_1$, $Q_{-1}$, and $Q_{-2}$, respectively. The adjustments to r are the same as those made in a repetition step.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that performs a square root operation, wherein the square root operation calculates an approximation of a square root, Q, of a radicand, R, the apparatus comprising:
    a selection mechanism configured to select an operation to perform based on higher-order bits of a remainder, r;
    an execution mechanism configured to perform the selected operation;
    wherein the operation involves subtracting two times a square root calculated thus far, q, and a coefficient, c, from r, and adding c to q;
    wherein the execution mechanism is configured to maintain r in carry-save form, which eliminates the need for carry propagation while updating r, thereby speeding up the square root operation.

2. The apparatus of claim 1, wherein the execution mechanism is configured to maintain r in carry-save form by maintaining a sum component, $r_s$, and a carry component, $r_c$.

3. The apparatus of claim 2,
    wherein the execution mechanism is additionally configured to maintain q in carry-save form by maintaining a sum component, $q_s$, and a carry component, $q_c$; and
    wherein the execution mechanism initializes q by setting $q_s$=0 and $q_c$=0.

4. The apparatus of claim 2,
    wherein the execution mechanism does not maintain q in carry-save form; and
    wherein the operation uses an on-the-fly technique to update q.

5. The apparatus of claim 2, further comprising an initialization mechanism configured to initialize r, q and c;
    wherein initializing r involves setting $r_s$=R and $r_c$=0;
    wherein initializing q involves setting q=0; and
    wherein initializing c involves setting c=1.

6. The apparatus of claim 2, wherein the operation additionally involves multiplying both $r_s$ and $r_c$ by 2 and dividing c by 2.

7. The apparatus of claim 2, wherein the operation additionally involves multiplying both $r_s$ and $r_c$ by 2, dividing c by 2 and then inverting the most significant bits of $r_s$ and $r_c$.

8. The apparatus of claim 2, wherein the operation additionally involves multiplying both $r_s$ and $r_c$ by 4, dividing c by 4 and then inverting the most significant bits of $r_s$ and $r_c$.

9. The apparatus of claim 2, wherein the operation additionally involves subtracting (2q+c) from $r_s$ and $r_c$, adding c to $q_s$ and $q_c$, multiplying both $r_s$ and $r_c$ by 2, dividing c by 2 and then inverting the most significant bits of $r_{rc}$.

10. The apparatus of claim 2, wherein the operation additionally involves subtracting (4q+4c) from $r_s$ and $r_c$, adding 2c to $q_s$ and $q_c$, multiplying both $r_s$ and $r_c$ by 2, dividing c by 2 and then inverting the most significant bits of $r_s$ and $r_c$.

11. The apparatus of claim 2, wherein the operation additionally involves adding (2q+c) to $r_s$ and $r_c$, subtracting c from $q_s$ and $q_c$, multiplying both $r_s$ and $r_c$ by 2, dividing c by 2 and then inverting the most significant bits of $r_s$ and $r_c$.

12. The apparatus of claim 2, wherein the operation additionally involves adding (4q+4c) to $r_s$ and $r_c$, subtracting 2c from $q_s$ and $q_c$, multiplying both $r_s$ and $r_c$ by 2, dividing c by 2 and then inverting the most significant bits of $r_s$ and $r_c$.

13. A computer system that performs a square root operation, wherein the square root operation calculates an approximation of a square root, Q, of a radicand, R, the computer system comprising:
    a processor;
    a memory;
    a square root unit within the processor;
    a selection mechanism within the square root unit configured to select an operation to perform based on higher-order bits of a remainder, r;
    an execution mechanism within the square root unit configured to perform the selected operation;
    wherein the operation involves subtracting two times a square root calculated thus far, q, and a coefficient, c, from r, and adding c to q;
    wherein the execution mechanism is configured to maintain r in carry-save form, which eliminates the need for carry propagation while updating r, thereby speeding up the square root operation.

* * * * *

UNITED STATES PATENT AND TRADEMARK OFFICE
CERTIFICATE OF CORRECTION

| | |
|---|---|
| PATENT NO. | : 7,139,786 B2 |
| APPLICATION NO. | : 10/436610 |
| DATED | : November 21, 2006 |
| INVENTOR(S) | : Josephus C. Ebergen |

It is certified that error appears in the above-identified patent and that said Letters Patent is hereby corrected as shown below:

In claim 9 (at column 10, line 24), please delete the equation, "$r_{rc}$" and replace with the equation --$r_s$ and $r_c$--.

Signed and Sealed this

Thirtieth Day of January, 2007

JON W. DUDAS
*Director of the United States Patent and Trademark Office*